United States Patent
Broy et al.

(10) Patent No.: US 11,789,702 B2
(45) Date of Patent: *Oct. 17, 2023

(54) AUTOMATIC DERIVATION OF SOFTWARE ENGINEERING ARTIFACT ATTRIBUTES

(71) Applicant: Siemens Aktiengesellschaft, Munich (DE)

(72) Inventors: Manfred Broy, Oberhaching (DE); Christian Körner, Bergen (DE); Reinhold Plösch, Linz (AT); Carolin Rubner, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,047

(22) Filed: Aug. 23, 2021

(65) Prior Publication Data
US 2022/0066742 A1    Mar. 3, 2022

(30) Foreign Application Priority Data
Aug. 25, 2020   (EP) .................................... 20192519

(51) Int. Cl.
*G06F 8/10*    (2018.01)
*G06F 8/77*    (2018.01)

(52) U.S. Cl.
CPC . *G06F 8/10* (2013.01); *G06F 8/77* (2013.01)

(58) Field of Classification Search
CPC ................. G06F 8/10; G06F 8/77; G06F 8/74
See application file for complete search history.

(56) References Cited

U.S. PATENT DOCUMENTS

| | | | |
|---|---|---|---|
| 6,715,130 B1 * | 3/2004 | Eiche ........................ | G06F 8/10 705/7.38 |
| 7,571,149 B1 * | 8/2009 | Yanosy, Jr. ............... | G06F 8/10 709/204 |
| 7,596,778 B2 * | 9/2009 | Kolawa ............... | G06F 11/3688 714/38.14 |
| 7,971,180 B2 * | 6/2011 | Kreamer ................ | G06Q 10/06 717/102 |
| 8,019,631 B2 * | 9/2011 | Bredin ................. | G06Q 10/063 705/7.11 |
| 8,386,994 B2 * | 2/2013 | Subash ..................... | G06F 8/10 717/102 |
| 8,635,204 B1 * | 1/2014 | Xie ........................... | G06F 8/71 707/E17.075 |

(Continued)

OTHER PUBLICATIONS

Search Report for EP Application No. 20192519.5, 8 pages, dated Feb. 15, 2021.

*Primary Examiner* — Matthew J Brophy
(74) *Attorney, Agent, or Firm* — Slayden Grubert Beard PLLC

(57) ABSTRACT

Various embodiments of the teachings herein include a computer-implemented method for automatic derivation of attributes of software engineering artifacts, which attributes arise from technical boundary condition of products or services, the method comprising: deducing technical requirements based on classifications of the technical boundary conditions; and mapping the deduced technical requirements of the artifacts to engineering disciplines and concerns.

12 Claims, 4 Drawing Sheets

(56) References Cited

U.S. PATENT DOCUMENTS

| | | | | |
|---|---|---|---|---|
| 8,954,925 | B2* | 2/2015 | Dutta | G06F 8/75 |
| | | | | 717/109 |
| 9,170,810 | B2* | 10/2015 | Koutyrine | G06F 11/3608 |
| 9,361,094 | B1* | 6/2016 | Xie | G06F 8/71 |
| 9,558,098 | B1* | 1/2017 | Alshayeb | G06F 11/3604 |
| 10,977,156 | B2* | 4/2021 | McGloin | G06F 8/75 |
| 11,340,871 | B1* | 5/2022 | Masis | G06F 8/33 |
| 2008/0289012 | A1* | 11/2008 | Shi | G06F 8/36 |
| | | | | 726/4 |
| 2008/0313596 | A1* | 12/2008 | Kreamer | G06Q 10/06 |
| | | | | 717/101 |
| 2009/0319313 | A1* | 12/2009 | Subash | G06F 11/3604 |
| | | | | 717/104 |
| 2010/0063785 | A1* | 3/2010 | Pich | G06T 11/206 |
| | | | | 703/6 |
| 2011/0271252 | A1* | 11/2011 | Bnayahu | G06F 11/3676 |
| | | | | 717/123 |
| 2011/0314445 | A1* | 12/2011 | Dutta | G06F 8/74 |
| | | | | 717/109 |
| 2013/0091488 | A1* | 4/2013 | Koutyrine | G06F 8/77 |
| | | | | 717/120 |
| 2014/0201711 | A1* | 7/2014 | Bertram | G06F 8/77 |
| | | | | 717/120 |
| 2016/0239546 | A1* | 8/2016 | Cuomo | G06F 16/248 |
| 2020/0057632 | A1* | 2/2020 | Harsukhlal Sodha | G06N 3/044 |
| 2020/0117427 | A1* | 4/2020 | McGloin | G06F 8/30 |
| 2020/0117573 | A1* | 4/2020 | McGloin | G06F 8/77 |
| 2021/0200515 | A1* | 7/2021 | Rayapati | G06F 40/216 |
| 2021/0357183 | A1* | 11/2021 | Maier | G06F 16/953 |
| 2021/0405976 | A1* | 12/2021 | Gaitonde | G06F 11/3664 |
| 2022/0066744 | A1* | 3/2022 | Körner | G06F 8/77 |

* cited by examiner

AUTOMATIC DERIVATION OF SOFTWARE ENGINEERING ARTIFACT ATTRIBUTES

CROSS-REFERENCE TO RELATED APPLICATIONS

This application claims priority to EP Application No. 20192519.5 filed Aug. 25, 2020, the contents of which are hereby incorporated by reference in their entirety.

TECHNICAL FIELD

The present disclosure is related to software engineering. Various embodiments of the teachings herein include computer-implemented methods and/or computer systems for automatic derivation of attributes of software engineering artifacts

BACKGROUND

To achieve a certain product or service quality, artifact quality must be aligned across the variety of engineering disciplines, especially software engineering disciplines depending on the underlying task or challenge. Unaligned artifact quality creates quality deficits. Up to now, no technical solution is provided to this sort of problem. Organizational or non-technical procedures are applied sometimes to create consistent attributes for software engineering artifacts, meaning engineering goals, but usually fail to create alignment especially for fairly complex systems or frequent changes in the development task.

SUMMARY

In view of this, the teachings of the present disclosure include methods for successful implementations of projects, product, or service developments that allows for an efficient evaluation of an increased number of requirements within less or the same time to calculate a consistent set of software engineering artifact attributes. Various embodiments of the teachings herein include a computer-implemented method for automatic derivation of attributes of software engineering artifacts, which attributes arise from technical boundary condition of products or services, comprising the measures: deduction of technical requirements by an automated software-based process based on classifications of the technical boundary conditions, and mapping the deduced technical requirements of the artifacts to engineering disciplines and concerns by an automated software-based process.

In some embodiments, the method further comprises mapping the calculated engineering artifacts to responsibilities.

In some embodiments, method further comprises evaluation of the mapping results based on software metrics.

In some embodiments, the method further comprises adaption of the classification of the technical boundary conditions based on the evaluation results in iterations.

In some embodiments, the method further comprises distribution calculation (DC) of the classification space.

In some embodiments, the distribution calculation (DC) of the classification space is based on a calculation of a single selection in technical boundary taxa and/or a calculation of distribution and quartiles.

In some embodiments, the distribution calculation (DC) results are stored and evaluated for further subjecting the calculation results to a metric based ranking.

As another example, some embodiments include a computer system for automatic derivation of software engineering artifacts (CA), comprising a first subsystem (1) with the components: a classifier software component (clas) for the classification of the technical boundary conditions, a calculation software component (map-con) for the deduction of the technical requirements (req), a mapping software (map-req) component for mapping the technical requirements (req) to engineering artifacts, an I/O-component (I/O) for receiving the technical boundary conditions data and for providing the calculation results, a storage component (stor), and a second subsystem (2) which provides a distribution calculator software (DC) component for the distribution of the classifications.

In some embodiments, the distribution calculator software (DC) component for the distribution of the classifications provides a calculation of single-selection combinations and/or a calculation of distribution and quartiles.

In some embodiments, the storage component (stor) comprises at least a data base containing relevant data for the mapping processes.

In some embodiments, the distribution calculator software component (DC) has access to the storage component (stor) for storing the calculation results.

In some embodiments, the first subsystem (1) comprises an evaluation software component (EC) for subjecting the calculation results to a metric based ranking.

As another example, some embodiments include a computer program product comprising instructions which, when the program is executed by a computer, cause the computer to carry out the steps of the methods as described herein.

As another example, some embodiments include a provision apparatus for the computer program products described herein, wherein the provision apparatus stores and/or provides the computer program product.

BRIEF DESCRIPTION OF THE DRAWINGS

The properties, features, and advantages of systems and methods incorporating teachings of this disclosure and the manner in which they are achieved will become clearer and more distinctly comprehensible in conjunction with the description of the exemplary embodiments that follows, these being explained in more detail in conjunction with the FIGS. 1 to 4, in a schematic depiction.

DETAILED DESCRIPTION

Figure 1:
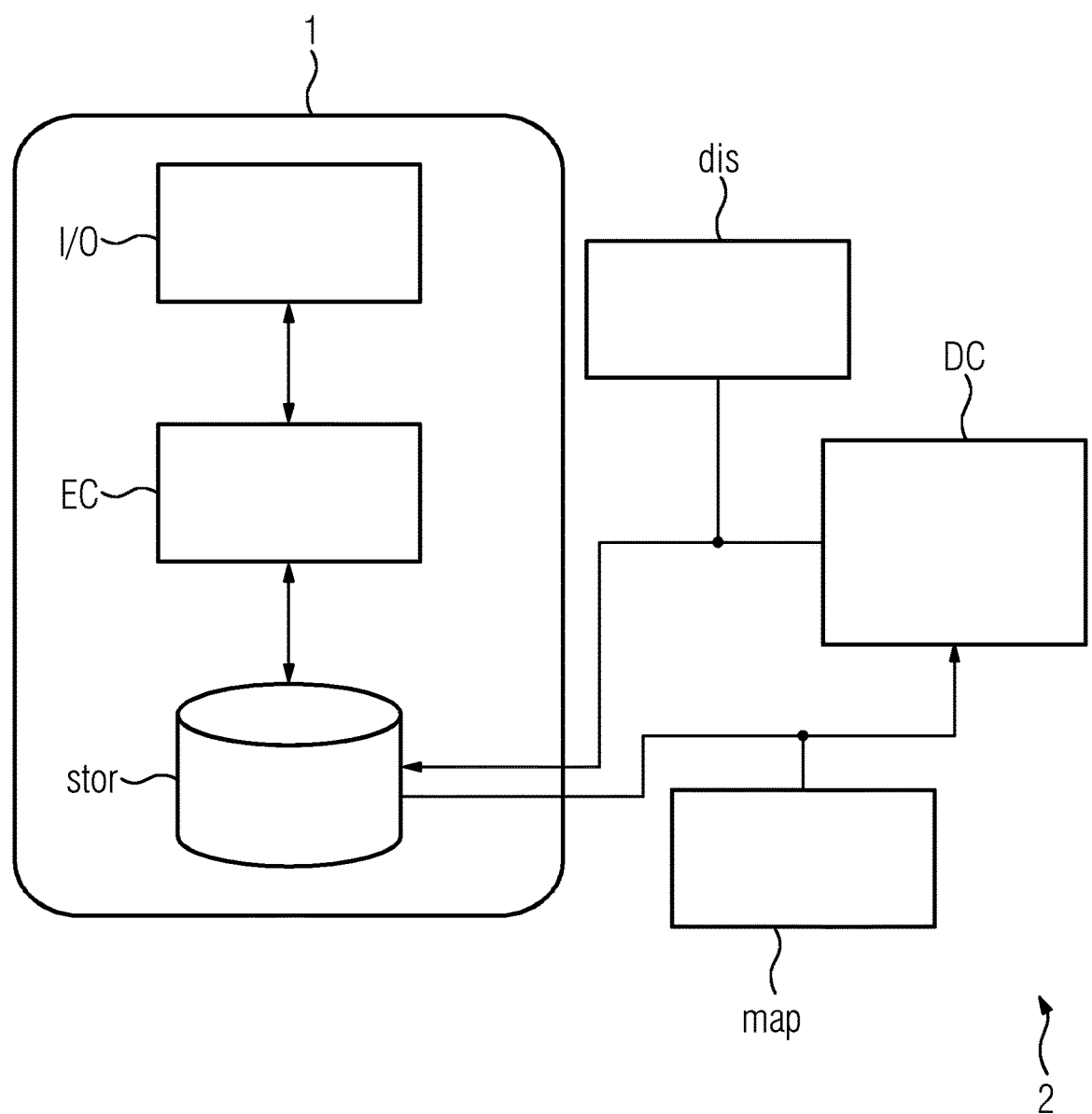
FIG. 1 shows a diagram for an exemplary embodiment of a system with first and second subsystem.

In some embodiments, a computer-implemented method for automatic derivation of attributes of software engineering artifacts, which attributes arise from technical boundary condition of products or services, comprises the measures: deduction of technical requirements by an automated software-based process based on classifications of the technical boundary conditions, and mapping the deduced technical requirements of the artifacts to engineering disciplines and concerns by an automated software based process.

This process provides the advantages of scalability, adequate pace and agility and elimination of bias.

In the context of this disclosure, a software engineering artifact is one of many kinds of tangible by-products produced during the development of software. Some artifacts help describe the function, architecture, and design of software. Other artifacts are concerned with the process of development itself, such as project plans, business cases, and risk assessments.

In the context of this disclosure, attributes of software engineering artifact are a quality and/or feature regarded as a characteristic or inherent part of a software engineering artifact.

In the context of this disclosure, a technical boundary condition is a condition that is required to be satisfied at all or part of the boundary of a region in which a set of (differential) conditions is to be solved.

In some embodiments, the computer-implemented method additionally comprises the measure of mapping the calculated engineering artifacts to responsibilities.

In the context of this disclosure, responsibilities meaning for example roles and/or disciplines.

In some embodiments, the computer-implemented method comprises the measure of evaluation of the mapping results based on software metrics. Software metrics in this application measure the completeness and/or selectivity of the mapping and not the underlying artifacts. It is used to check whether the mapping is useful to the application.

In some embodiments, the computer-implemented method further comprises the measure of adaption of the classification of the technical boundary conditions based on the evaluation results in iterations.

In some embodiments, the computer-implemented method comprises the measure Distribution calculation (DC) of the classification space. Classification space in the context of this application meaning space created by the classification vectors and their classification attributes.

In some embodiments, the distribution calculation of the classification space is based on a calculation of a single selection in technical boundary taxa and/or a calculation of distribution and quartiles.

In some embodiments, the distribution calculation results are stored and evaluated for further subjecting the calculation results to a metric based ranking.

In some embodiments, there is a computer system for automatic derivation of software engineering artifacts, according to the invention, the system comprising a first subsystem with the following components:
  a classifier software component for the classification of the technical boundary conditions,
  a calculation software component for the deduction of the technical requirements,
  at least one mapping software component for mapping the technical requirements to engineering artifacts,
  an I/O-component for receiving the technical boundary conditions data and for providing the calculation results
  a storage component,
and comprises a second subsystem which provides
  a distribution calculator software component for the distribution of the classifications.

Engineering artifacts are usually digital disciplines and/or concerns that are used to guide, implement, describe and validate the respective product.

In some embodiments, the computer system comprises a distribution calculator software component for the distribution of the classifications which provides a calculation of single-selection combinations and/or a calculation of distribution and quartiles.

In some embodiments, the storage component comprises at least a data base containing relevant data for the mapping processes.

In some embodiments, the distribution calculator software component has access to the storage component for storing the calculation results.

In some embodiments, the first subsystem comprises an evaluation software component for subjecting the calculation results to a metric based ranking.

In some embodiments, there is a computer program product is claimed, having program instructions which, when the program is executed by a computer, cause the computer to carry out the steps of the methods described herein.

In some embodiments, there is a provision apparatus for storing and/or providing the computer program products. The provision apparatus is a data storage medium that stores and/or provides the computer program product, for example. In some embodiments, the provision apparatus is a network service, a computer system, a server system, particularly a distributed computer system, a cloud-based computer system and/or a virtual computer system that stores and/or provides the computer program product in the form of a data stream, for example.

This provision may be effected as a download in the form of a program data block and/or instruction data block, e.g. as a file, particularly as a download file, or a data stream, particularly as a download data stream, of the complete computer program product, for example. This provision can alternatively be affected as a partial download that consists of multiple parts and is downloaded particularly via a peer-to-peer network or provided as a data stream, for example. Such a computer program product is read in, for example using the provision apparatus in the form of the data storage medium, in a system and executes the program instructions, so that the method according to the invention is executed on a computer or configures the creation device such that it creates cited system and/or execution unit according to the invention.

Definitions

As used herein, the term "a technical system" refers, for example, to a device, apparatus, or a plant. A technical system can, for example, be a field device, a generator or a power plant, e.g. a wind turbine, a solar power plant or a water power plant. In some embodiments, the technical system comprises a plurality of hardware components and/or software components. Furthermore, the technical system can, for example, comprise at least one component having a communication interface configured to connect the inventive apparatus and/or a test environment.

Unless specifically stated otherwise, throughout the specification discussions utilizing terms such as "processing", "computing", "computer-based", "calculating", "determining", "generating", "configuring" or the like, refer to the action and/or processes of a computer that manipulates and/or transforms data into other data, said data represented as physical, e.g. such as electronic, quantities. The term "computer" should be expansively construed to cover any kind of electronic device with data processing capabilities, including, by way of non-limiting example, personal computers, servers, handheld computer systems, Pocket PC devices, Cellular communication device and other communication devices with computing capabilities, processors and other electronic computing devices.

As used herein, the term "processor" refers, for example, to controllers, microcontrollers (e.g. digital signal processor (DSP) possibly in combination with memory and storage units memory unit storing computer-readable instructions, application specific integrated circuit "ASIC", etc.), processor cores, central processing units, integrated circuits/processing circuitry (e.g. application specific integrated circuit "ASIC", field programmable gate arrays "FPGA" etc.) or digital signal processors. Furthermore, the term "processor" can, for example, refer to virtual processors, virtual CPUs, soft processors or soft CPUs. Moreover, said processor can, for example, be configured to execute computer readable instructions such that said processor may be configured to perform functions which implement the teachings herein.

As used herein, the term "module" refers, for example, to a processor and/or a memory unit storing computer-readable instructions. For example, the processor may be specifically configured to execute the computer readable instructions such that said processor may be configured to perform functions which implement the methods, such as a step of the method. Furthermore, the term "module" can, for example, refer to means (e.g., a processor) which are configured to implement/execute functions/steps of the methods.

As used herein, the term "subtree", "tree", or the like, refer, for example, to data structures storing information about the technical system and/or components of the technical system. Preferably, a subtree is a branch of a (component fault) tree or a partial (component fault) tree, defined, for example, by a selected node in the tree as top level node of the subtree.

As used herein, the term "model", "component", "failure mode" and other elements of a component fault tree or the like, refer, for example, especially in conjunction with a subtree or tree to data structures containing information about the technical system and/or its components.

As used herein, the term "acquisition module" refers, to a sensor or measurement equipment to measure a physical quantity. For example, an acquisition module can be a LIDAR to measure upcoming guests of wind and/or an acceleration sensor to measure the acceleration of the wind turbine and/or a speed sensor to measure a rotor speed of the wind turbine and/or a pitch angle sensor to measure a pitch angle of blades of a wind turbine and/or a power sensor to measure generated electrical power of a wind turbine and/or a speed sensor to measure an actual wind speed driving the wind turbine.

The accompanying drawings are intended to provide a better understanding of the embodiments shown therein. They show embodiments and serve in conjunction with the description to explain principles and concepts of the disclosed subject matter. Other embodiments and many of the cited advantages will emerge in respect of the drawings. The elements of the drawings are not necessarily shown in scale with one another. Identical reference characters here designate identical components or components of comparable effect.

In some embodiments, the presented embodiments are implemented by a processor and/or a memory device unless otherwise noted. In detail, to implement and/or execute the methods, components, devices etc. comprise at least one processor and/or at least one memory device unless otherwise noted. Additionally, the methods, components, devices, etc. comprise, for example, other features known by a skilled person. For example, these features can be an input device, like a computer mouse, or a display device, like a TFT-display.

In some embodiments, the method for successful implementations of projects, product or service developments or even of new business models demands contains a scalable and reproducible deduction of technical concerns. The provided semi-automated method for example helps to define cornerstones of an engineering strategy by determining the minimal needed quality of core artifacts of the engineering and operation process, like requirements, enterprise architecture, source code, test strategy, test plan, change requests, etc. These artifacts can be part of an engineering canvas, for example comprising several building blocks like requirements management, architecture management, etc., see Tab. 1.

In some embodiments, the method comprises two main processes. On the one hand, the process definition. First, there are basic definitions like roles, artifacts, engineering concerns, building block refinements, representing the taxa for classification, to be considered. Further, there is an initial concept or canvas concerning a product or service idea, there are relationships, mapping to engineering concerns, software engineering canvas, and an artifact role mapping. These are complemented by a validation of the definition and mappings, e.g. completeness and variance. Finally there could be an evaluation by examples. On the other hand, the method comprises the process Goal derivation. In tabular 1 for example, a results overview of the top-level engineering goals is shown.

TABLE 1

Example of Interface: Assignment Software Engineering Building Blocks (SEBB) to quality levels

| Requirements management | Architecture management | Software implementation | Test | Delivery & Deployment | Operations management | Maintenance | | |
|---|---|---|---|---|---|---|---|---|
| 1, 5 | 2 | 2 | 2 | 2 | 2 | 2 | | Basic Engineering Quality |
| 4 | 4 | 4 | 4 | 4 | 4 | 4 | | Peak Quality Engineering |
| 2 | 4 | 2 | 1 | 2, 5 | 4 | 4 | Min | Automation grade |
| 3 | 4 | 4 | 4 | 4 | 4 | 4 | Max | Automation grade |
| 2 | 4 | 3 | 3 | 4 | 4 | 4 | Min | 3 |
| 4 | 4 | 4 | 4 | 4 | 4 | 4 | Max | Estimation capability |

Needed quality of an artifact means that it has to contain specific information items and, depending on the quality levels, quantitative data that helps to control the development process and the maturity and completeness of the artifacts. The method may be focused on artifacts, not on the process how these artifacts are created and maintained and can therefore be used regardless of the underlying development process.

In a first step, technical boundary conditions are identified and classified. Then, the technical requirements are deduced in an automated software-based process. The relations between specific building block refinements of the initial concept con and the requirement types req are defined and justified by a so-called Mapping map-con, see FIG. 3. This step is based on a model that allows selecting the major characteristics of new projects, product or service developments or even of new business models. This model can be implemented in Microsoft Excel. For users' selections, single selections in drop down boxes are preferably provided. The deduced technical requirements can be classified in requirement types that have an impact on implementation, operation of products and services or even the design.

Concerning the before mentioned quality levels, an overall requirements severity for a project, product, or service development is calculated based on this selection. This requirements severity level for example is between 0 and 4 and defines the minimum quality to be achieved, and therefore the minimum content that the key artifacts of the project, product or service development have to contain. Additionally, suggestions for quality levels can be calculated for the distinct key artifacts of an engineering project. The requirements, a test plan, source code etc can define different impacts on the needed content and quality of the distinct artifacts.

Specifying the required quality levels of the key artifacts that are for example organized along major phases of a software development project, can be based on a software engineering template.

Figure 3:
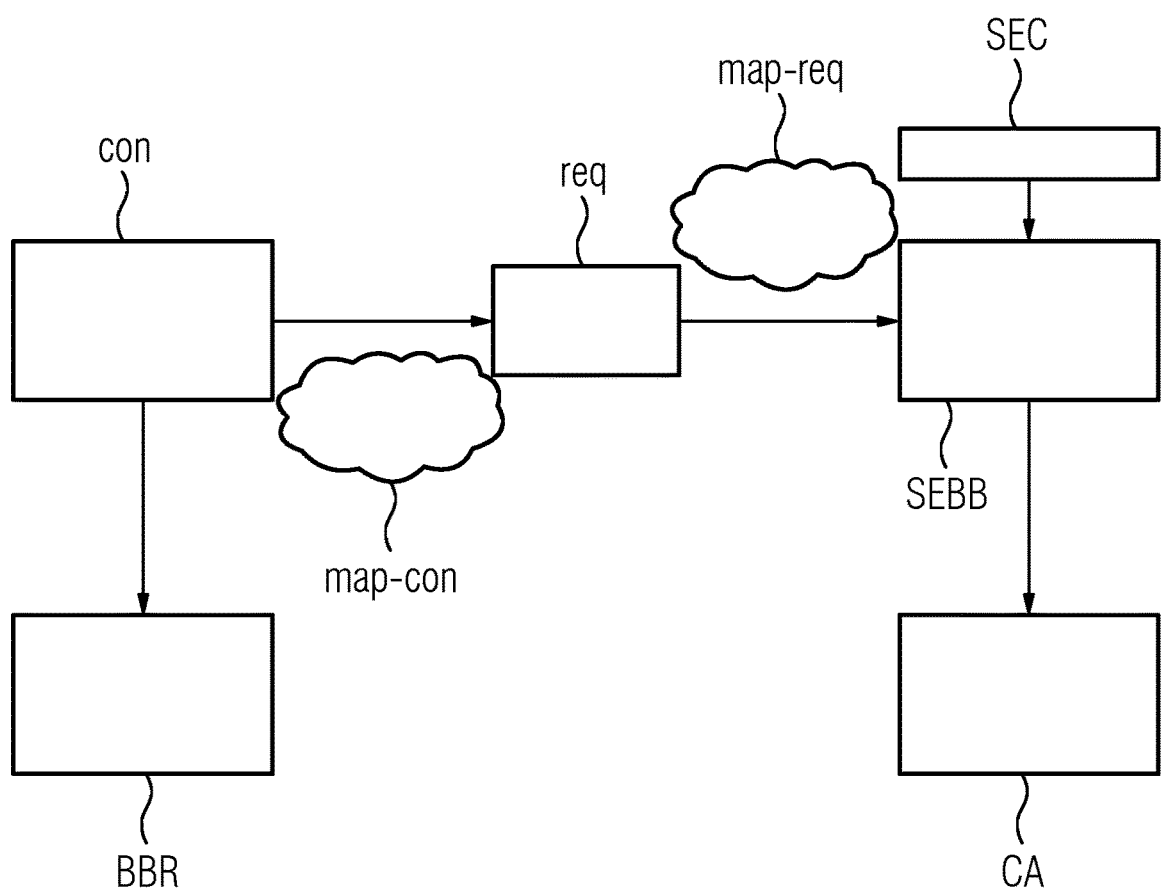
FIG. 3 shows the relations between the method steps of an example method.

In some embodiments, these technical requirements are mapped to engineering artifacts and concerns, see FIG. 3, map-con. For the automated calculation of quality levels, a number of mappings are defined in the before mentioned model. Different Requirement Types req are derived from different content and quality that is needed for the artifacts of a project. E.g. the requirements complexity is much higher when dealing with a complex multi-level project. The mapping of the requirement types for example to a software engineering template defines a minimum quality level for the key software artifacts based on the characteristics of the requirement types. In some embodiments, the deduced engineering artifacts are further mapped to responsibilities.

This process can be followed by an evaluation step, see Tab.2, that is based on software metrics. In some embodiments, the evaluation results are used to adapt the initial classification of the technical boundary conditions in several iterations.

TABLE 2

| Definition process | | | | |
|---|---|---|---|---|
| Basic definitions | Mappings | Distribution | Plausibility checks | Evaluation |
| Artifacts Roles Concept elements | Concept to Engineering concerns | Concept and Engineering goal | Completeness Statistics | Test scenarios |

TABLE 2-continued

| Definition process | | | | |
|---|---|---|---|---|
| Basic definitions | Mappings | Distribution | Plausibility checks | Evaluation |
| Engineering concerns Metrics (in first subsystem 1) | Software engineering template Artifact-quality-mapping Artifact-automation-mapping Valuation mapping Collaboration mapping (in first subsystem 1) | calculation EC (in second subsystem 2) | | |

As shown in FIG. 3, the model does not draw a direct relation between an initial concept and the software engineering template SEC, but uses so called requirements types req to decouple the two sides in order to reduce the effort for defining and describing the relationships between. Furthermore, the requirements types req help in narrowing the semantic gap. A major benefit is the refinement of the problem space and an improvement of the mapping characteristics. The requirement types req are kind of a middle-tier that facilitates relating a development concept with a software engineering canvas SEC. The requirement types req classify a software or system service or a software product from various key demands, like functional suitability, functional quality, engineering quality, and operational quality. Depending on the importance of the individual requirement types req, this has an impact on the way development and operations of a service have to be carried out.

The defined mappings, map-con, map-req, relate every element of the method to each other, see FIG. 3. In the first place, there is a concept, con, for example a project idea, a development plan, a business model canvas, which comprises several Building blocks BB or Building Block Refinements BBR. In the concept-to-requirements-mapping, map-con, technical requirements req are deduced in an automated software-based process.

The concrete form of the concept con, how complex or multi-sided it is, has an impact on the requirement types, e.g. requirements' complexity, resulting in different content and quality that is needed for the artifacts of a project, compare Tab.3. Both mappings, map-con, map-req, for example provide an automated calculation of the quality levels respectively.

In the requirements-to-engineering-artifacts-mapping, map-req, technical requirements are mapped to engineering artifacts. In the field of software engineering, this mapping defines a minimum quality level for the key software artifacts based on the characteristics of the requirement types. The requirements-to-engineering-artifacts-mapping, map-req, for example results in software engineering building blocks SEBB. With respect to an underlying software engineering canvas SEC and the derived software engineering building blocks SEBB core artifacts CA are obtained. For each key software or role artifact CA and for each quality level respectively, the necessary roles for developing and maintaining the artifact as well as which roles should use the artifact in order to be able to fulfil the tasks of the role are defined.

Generally, any mapping is explicitly specified and can be modified, e.g. in the model, in order to better reflect the needs of a specific organization or division. Such modifications would also allow, to remove or add requirement types, to change the impact of the concept elements on the requirement types, to change the minimum required quality level for key software artifacts, to add or remove key artifacts, and to redefine the required roles for each artifact.

TABLE 3

Automated derivation process

| Concept Classification | Engineering difficulty | Artifact related goals |
|---|---|---|
| Select on entry of each segment of the initial concept of project idea, development plan, business model canvas | Calculate the value for each engineering concern map-con, and relate using the distribution of all possible elections. Aggregate the ratings over all engineering concerns (Average) | Quality Automation grade Evaluation capability Artifact collaboration |

Figure 2:
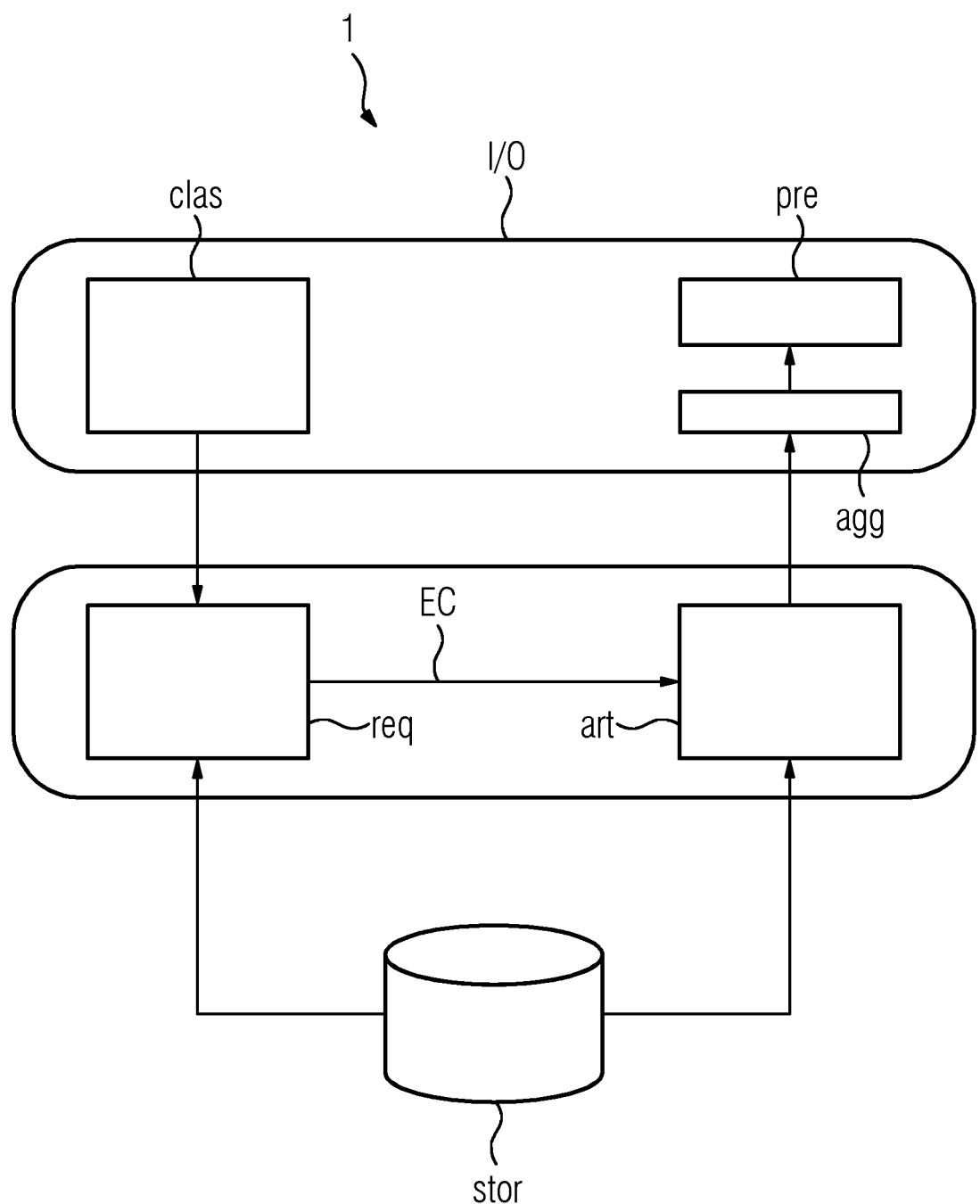
FIG. 2 shows the first subsystem 1 with its components.

In some embodiments, the method is suitably executed by a computer system, see FIGS. 1 and 2, comprising a classifier software component, clas, for the classification of the technical boundary conditions, a calculation software component, map-con, for the deduction of the technical requirements, req, and at least one mapping software component, map-req, for mapping the technical requirements to engineering artifacts, disciplines and concerns.

In some embodiments, the computer system further comprises an I/O-component, I/O, for receiving the technical boundary conditions data and for providing the calculation results, especially for the input of classification and mapping data and for the output of engineering goals and respective mappings. The computer system comprises at least a storage component, stor, the storage component e.g. comprising at least a data base containing relevant data for the mapping processes. In the storage component, stor, basic definitions, mappings and distributions are stored.

In some embodiments, the components are combined in a first subsystem. In some embodiments, a second subsystem provides a distribution calculator software component for the distribution of the classifications, which is a calculation of single-selection combinations and/or a calculation of distribution and quartiles. The distribution calculation results are stored in the storage component. In some embodiments, the first subsystem comprises an evaluation software component for subjecting these results to a metric based ranking. The I/O-component provides scalable and reproducible calculation results.

Figure 4:
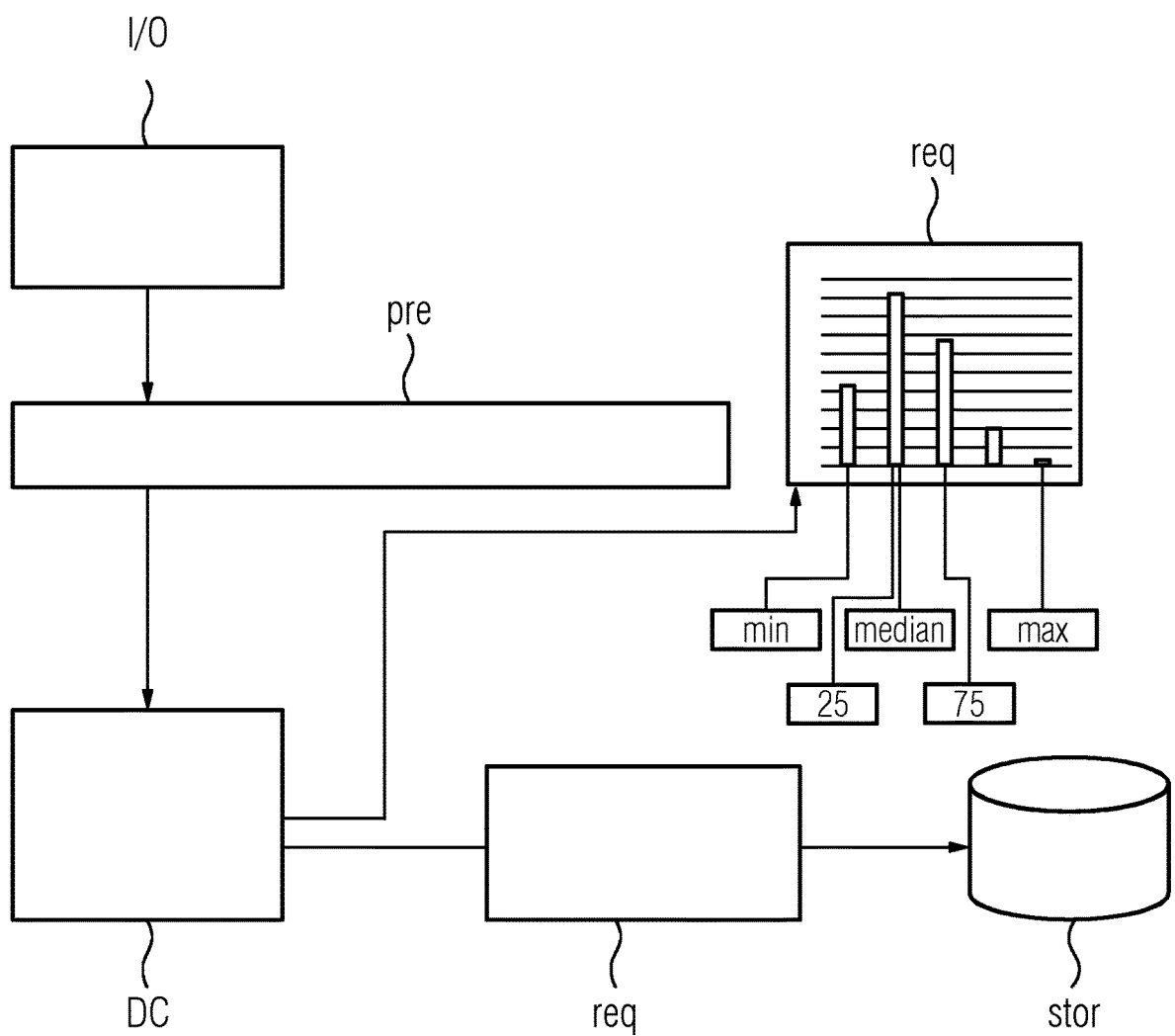
FIG. 4 shows a diagram for the distribution calculation interaction with modules of the first subsystem.

FIG. 4 shows a diagram for the distribution calculation DC interaction with the interface module I/O and storage module, stor, of the first subsystem 1. In some embodiments, the interface component I/O provides input of classification and mapping data to the distribution calculation DC in the second subsystem 2. The distribution calculation module DC uses the mapping, map-con, between concept and engineering concerns to calculate a distribution of all possible classifications, req. This resulting distribution is created and stored to the datastore, store. In the calculation of the distribution and quartiles, all combinations can be enumerated using an odometer with a wheel for each segment of the concept, con. The number of digits per wheel are the number of selections in a segment. The value of the digit holds or refers to the value of a selected refinement. The value of a combination is the sum of the values of all selected refinements. For all combination values, a histogram of the distribution is created for the quartiles to be calculated easily. The overall number of combinations is the product of all segment combinations. We create a distribution for each engineering concern. The interface component I/O further provides the output of engineering goals and mappings to a user.

The system provides an automated mapping between a concept, con, and artifact-based engineering goals. Selections in the concept segments are provided to the system as input data. Output, for example, are artifact-names with quality grade, automation grade and estimations capability. Grades are aggregated at discipline and organization level to provide an overview.

The main challenge of the described method is to bridge the semantic gap between concept and engineering artifacts in a comprehensible way for the definition of the mapping and the evaluation of a concept selection. Therefor mappings between intermediate values are provided, like the concept-to-requirements-mapping, map-con, and the requirements-to-engineering-artifacts-mapping, map-req, but also further mappings from a software engineering canvas, SEC, to artifact quality, automation grade and/or evaluation capability.

In some embodiments, the method provides a fully automated calculation, which limits are based on calculated quartiles and not randomly defined. To conclude, the presented computer-implemented method for successful implementations of projects, product or service developments or even of new business models demands, contains a scalable and reproducible deduction of technical concerns.

After the identification and classification of the technical boundary conditions, in a first step, technical requirements are deduced in an automated software-based process. In a further step of this automated software-based process, these technical requirements are mapped to engineering artifacts and concerns. In some embodiments, the deduced engineering artifacts are further mapped to responsibilities. This process can be followed by an evaluation step that is based on software metrics. In an embodiment, the evaluation results are used to adapt the initial classification of the technical boundary conditions in several iterations.

In some embodiments, the provided method is suitably executed by a computer system comprising a classifier software component for the classification of the technical boundary conditions, a calculation software component for the deduction of the technical requirements and at least one mapping software component for mapping the technical requirements to engineering artifacts, disciplines and concerns. The computer system further comprises an I/O-component for receiving the technical boundary conditions data and for providing the calculation results. The computer system comprises at least a storage component, the storage component e.g. comprising at least a data base containing relevant data for the mapping processes.

In some embodiments, the components are combined in a first subsystem. In some embodiments, a second subsystem provides a distribution calculator software component for the distribution of the classifications, which is a calculation of single-selection combinations and/or a calculation of distribution and quartiles. The distribution calculation results are stored in the storage component. In some embodiments, the first subsystem comprises an evaluation software component for subjecting these results to a metric based ranking. The I/O-component provides scalable and reproducible calculation results.

REFERENCES

EC Engineering goal calculator/calculation
DC Distribution calculator/calculation, Definition
stor Data storage
dis Distributor, e.g. project distribution
I/O Input/Output, user interface
clas Classification, e.g. project classification
pre presentation
agg aggregator
req requirements, e.g. engineering requirements
art artifacts, e.g. quality, automation, grade, valuation, collaboration
1 first subsystem
2 second subsystem
con concept, e.g. project idea, development plan, business model canvas, comprising several Building blocks (BB)
BBR Building Block Refinements
SEBB Software Engineering Building Blocks
map-con concept-to-requirements-mapping: technical requirements are deduced in an automated software-based process
map-req requirements-to-engineering-artifacts-mapping: technical requirements are mapped to engineering artifacts
CA core artifacts
SEC software engineering template or canvas

The invention claimed is:

1. A computer-implemented method for automatic derivation of software engineering artifacts with attributes related to technical boundary condition of products or services, the method comprising:
receiving technical boundary conditions;
classifying the technical boundary conditions and mapping the technical boundary conditions to technical requirements with an automated software-based process;
classifying the technical requirements in requirement types;
mapping the technical requirements to engineering artifacts by an automated software-based process;
wherein the engineering artifacts contain specific information items and quantitative data; and
wherein mapping of technical requirements to engineering artifacts defines a minimum quality level for the artifacts based on the requirement types;
evaluating the mapping results based on software metrics;
mapping the calculated engineering artifacts to responsibilities;
adapting the classification of the technical boundary conditions based on the evaluation results in iterations;
providing a distribution calculation of all possible classifications based on a calculation of a multi-selection in technical boundary taxa and a calculation of distribution and quartiles; and
providing the calculation results.

2. A computer-implemented method according to claim 1, further comprising mapping the calculated engineering artifacts to responsibilities.

3. A computer-implemented method according to claim 1, further comprising evaluating the mapping results based on software metrics.

4. A computer-implemented method according to claim 1, further comprising adapting the classification of the technical boundary conditions based on the evaluation results in iterations.

5. A computer-implemented method according to claim 1, further comprising calculating a classification space based on the classifications.

6. A computer-implemented method according to claim 5, wherein calculating the classification space is based on a calculation of a single selection in technical boundary taxa and/or a calculation of distribution and quartiles.

7. A computer-implemented method according to claim 5, further comprising storing and evaluating the calculated classification space for further subjecting the calculation results to a metric based ranking.

8. A computer system for automatic derivation of software engineering artifacts, the system comprising:
an input/output for receiving technical boundary conditions and providing calculation results;
a classifier software component for: classifying the technical boundary conditions and classifying the technical requirements in requirement types;
a mapping software component for mapping the technical boundary conditions to technical requirements, and mapping the technical requirements to engineering artifacts, wherein the engineering artifacts contain specific information items and quantitative data and mapping of technical requirements to engineering artifacts defines a minimum quality level for the artifacts based on the requirement types;
an evaluation component for evaluating the mapping results based on software metrics and adapting the classification of the technical boundary conditions based on the evaluation results in iterations;
a storage component; and
a distribution calculator software component for the distribution of the classifications, including a distribution calculation of all possible classifications based on a calculation of a multi-selection in technical boundary taxa and a calculation of distribution and quartiles.

9. A computer system according to claim 8, wherein the distribution calculator software component for the distribution of the classifications provides a calculation of single-selection combinations and/or a calculation of distribution and quartiles.

10. A computer system according to claim 8, wherein the storage component comprises a data base containing relevant data for the mapping processes.

11. A computer system according to claim 8, wherein the distribution calculator software component has access to the storage component for storing the calculation results.

12. A computer system according to claim 8, wherein the first subsystem comprises an evaluation software component for subjecting the calculation results to a metric based ranking.

* * * * *